United States Patent Office 2,995,574
Patented Aug. 8, 1961

2,995,574
PREPARATION OF VISNADIN FROM AMMI VISNAGA
Jean Georges Le Men, Paris, France, assignor to Société anonyme dite: Laboratoire Roger Bellon, Neuilly-sur-Seine, France, a French company
Filed May 25, 1959, Ser. No. 815,594
Claims priority, application France June 10, 1958
5 Claims. (Cl. 260—343.2)

This invention relates to the preparation of the chemical compound known as visnadine, as derived from the plant *Ammi visnaga*.

*Ammi visnaga* is a plant of the Umbelliferae family, which has been known and used for its therapeutic properties by the peoples of the Mediterranean basin since times immemorial. In recent years various scientific investigators have turned their attention to this plant with interesting results. From its seeds a number of substances of the furo-chromone group have been extracted, included principally khelline, which is an antispasmodic drug acting primarily on the coronary, bronchic and ureteral fibers. A great many other substances have also been extracted from *Ammi visnaga* but their properties are perhaps less well-known. In 1950, Cavallito and Roxkwell have isolated a vitreous substance having a potent vaso-dilator activity.

Subsequent work has led to the derivation from *Ammi visnaga* of substances of the coumarine class among which the compound known as "Provismine" appears to have the highest physiologic activity. This compound has been described especially by Hamed Abu Shady in Proceedings of the Pharmaceutical Society of Egypt, Sc. ed. vol. XXXVIII, No. 12, December 1956.

Quite recently Smith, Hosansky, Bywater and Van Tamelen (Jour. American Chemical Soc., 79, July 5, 1957) have subjected a mixture known as Visnagan derived from the mother-liquor resulting from the preparation of khelline, to complex techniques involving chromatography and have thereby succeeded in separating, on a laboratory scale, a number of definite chemical compounds. One of these, termed Visnadine, has been shown to have highly important therapeutic properties.

Visnadine has the analytic formula $C_{21}H_{24}O_7$ and the developed formula

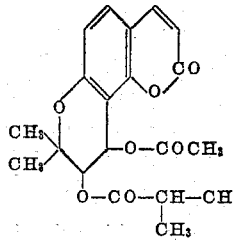

It has a melting point of 86 to 88° C. Its rotatory power in a 1% solution in absolute alcohol is $+10\pm1°$; and in a 1% solution in dioxane is $+38°\pm1°$.

Figure 1:
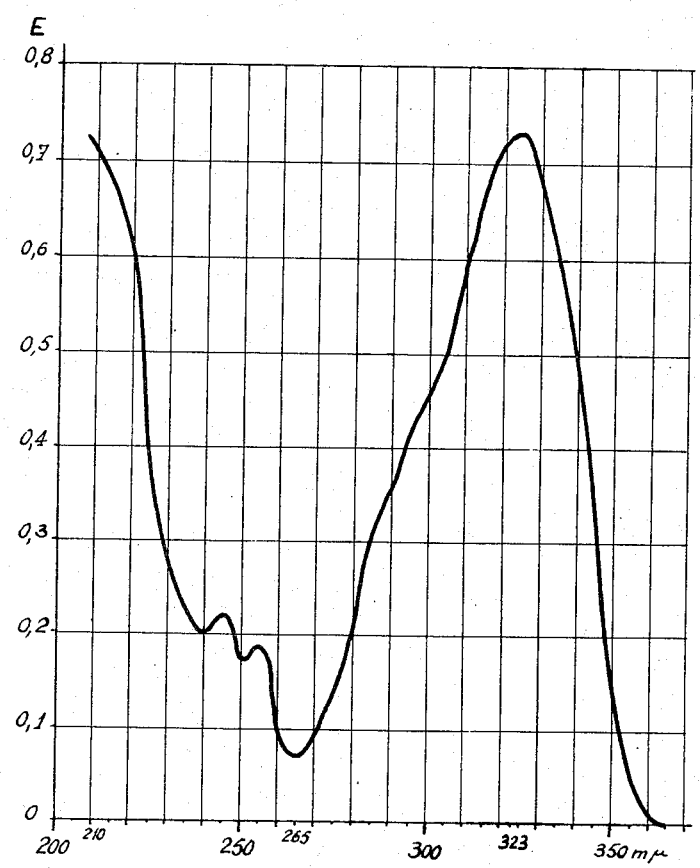

Crystallized visnadine has a characteristic spectrum in the ultra-violet range as shown in FIG. 1 of the attached drawings. This spectrum has a minimum at 264 m$\mu$, log $\xi=3.29$, and a maximum at 323 m$\mu$, log $\xi=4.14$.

Figure 2:
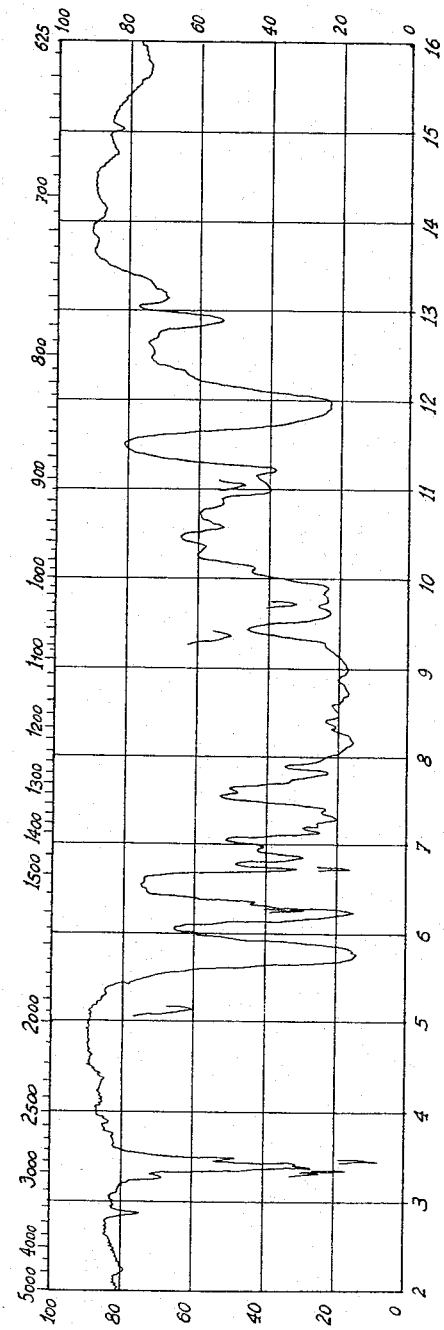

It also has a characteristic absorption spectrum in the infrared range as shown in FIG. 2 of the accompanying drawings.

It is the object of the present invention to provide improved methods of deriving of visnadine, whereby this substance may be produced economically on an industrial scale. Yields attainable by the method of the invention are on the order of 6 to 7 per mil.

In accordance with the invention visnadine is extracted with a solvent from the dried umbels of *Ammi visnaga*. The umbels are preferably first stripped of their seed, chopped and ground. The extract solution is then concentrated and crude visnadine is crystallized out. This crude product is then purified and the purified product is dissolved in a solvent and crystallized out.

According to the invention visnadine is extracted from the umbels of *Ammi visnaga* by an organic solvent having a boiling point less than 110° C. The resulting solution is concentrated first by heating in a water bath and then is allowed to stand some time at a temperature of about 20° C. and if necessary is treated for separation of gummy constituents therefrom, after which the solution is concentrated under reduced pressure. Finally the crude product is crystallized and separated by retaining it on a filter.

This crude product may then, according to the invention, be purified by mixing it with petroleum ether and allowing it to stand at ordinary temperature, then filtering it to obtain the pure visnadine.

According to another feature of the invention, the visnadine is crystallized by dissolving the purified product in a first solvent, then adding activated carbon to the solution and filtering it, thereafter adding to the resulting filtrate as a precipitation agent a second solvent miscible with the first and lastly, after allowing the mixture to stand at least 24 hours at a temperature of about $-10°$ C., filtering it to recover the crystallized visnadine.

According to a modified procedure of the invention, the following technique may be used in crystallizing the visnadine.

The purified visnadine is dissolved at elevated temperature in a third solvent. To this solution activated carbon is added and the solution is filtered, a filtering aid being added if necessary for this purpose. After a quiescent period of at least 24 hours at a temperature of about $-10°$ C., the crystallized visnadine is recovered by filtration.

The first solvent mentioned above should be selected from among the very good solvents of visnadine and may be an ether-oxide such as tetrahydrofurane, dioxane, ethyl ether, isopropyl ether or it may be an alcohol such as methanol, ethanol, propanol, isopropanol or cyclohexanol; an ester such as methyl acetate or ethyl acetate; an aromatic hydrocarbon such as benzene or toluene; or a ketone such as acetone, methylethyl-ketone or cyclohexane; a glycol such as ethylene-glycol, diethylene-glycol, propylene-glycol or glycol monoacetate; a chlorinated aliphatic hydrocarbon such as methylene chloride, chloroform, mono-, di- or tri-chloroethylene; or it may be any one of such nitrogen-containing solvents as pyridine or dimethylformamide.

The second solvent specified above is selected from amongst the poor solvents of visnadine and may be an alkane such as pentane, hexane, or heptane alone or in admixture; or a petroleum ether fraction distilling in the range 35–70° C., or it may be distilled water.

The third solvent referred to is a moderately good solvent of visnadine and may be a cyclanic hydrocarbon such as cyclohexane, or a petroleum fraction of grade "C" distilling in the range 70–100° C.

It will be understood that the above enumerations of substances usable as the first, second and third solvents respectively in the method of the invention are illustrative but not exhaustive.

An example will now be described of the practical operation of the method of the invention. The starting material used consists of dry umbels of *Ammi visnaga* preliminarily stripped of their seed in order to increase the yield and to simplify the extracting and purifying operations.

(1) *Reduction to powder.*—The dried umbels are cut up with a chopper and ground to a fine powder, e.g. to a fineness such as to pass between the screens of modulus 23 and 27 according to the international screening standard.

(2) *Extraction.*—The liquid used for extraction is petroleum ether (boiling from 35 to 70° C.) The apparatus used is of the Soxhlet type and the extraction is continued until an aliquot proportion of the petroleum ether treated as indicated below indicates that a yield of from 15 to 16 mil has been attained in terms of the substance referred to hereinafter as "crude visnadine."

(3) *Preconcentration.*—The petrol-ether solution thus obtained is concentrated to a degree such as to obtain a volume of about 1.5 liters per kilogram umbel stock used. This concentration is effected by heating in a water bath at a temperature not exceeding 80° C. After a quiescent period of from 12 to 24 hours at a temperature of about 20° C. the gummy deposit which is found to have formed is separated out by decantation or syphoning. The formation of any deposits should be carefully checked, since it is possible that the visnadine may commence to crystallize due to contamination by germs. To avert this occurrence all apparatus used should be carefully cleaned. Should in spite of these precautions some crystallization set in, the liquid should be syphoned off immediately (4) *Final concentration and production of crude visnadine.*—The solution stripped of any gummy constituents is concentrated under reduced pressure until a volume of from 100 to 200 cc. per kg. umbels used is obtained. The concentrated solution is allowed to rest 48 hours at a temperature of about −10° C. An amount of visnadine has then crystallized corresponding to a yield of 15 to 16 grams crude visnadine per kilogram umbels. The liquid is filtered in a Buchner funnel.

This operation is only possible if all gummy constituents have first been removed. Otherwise centrifuging would have to be used but this in turn is dangerous owing to the presence of an extremely volatile and inflammable solvent.

(5) *Purified visnadine.*—The crude visnadine is mixed thoroughly with petroleum ether in an amount of 100 cc. ether per kg. umbels used. This yields a uniform pulp which is then allowed to stand 24 hours at a temperature of about 15° C., then filtered in a Buchner funnel to recover the pure visnadine, which is obtained with a yield of from 85–90% in terms of the crude visnadine.

(6) *Crystallized visnadine.*—Two different procedures may be used to obtain crystallized visnadine, as described hereinafter under *a* and *b*:

(a) The purified visnadine is dissolved in 5 parts of a very good solvent of visnadine such as any of the substances indicated above as the "first solvent." Active carbon is added to the solution, this is then agitated 30 minutes and then filtered. To the colourless filtrate there are added 25 parts of a solvent that has much less solvent power to visnadine than the first solvent used, e.g. any of the solvents listed hereinabove as the "second solvent," and which moreover is miscible with said first solvent. The solution is allowed to stand for 24 to 48 hours at a temperature of about −10° C. and the crystallized visnadine is finally recovered by filtration in a Buchner funnel.

(b) The purified visnadine is dissolved at elevated temperature in a poor solvent such as any of those listed as the "third solvent" above. The amount of this solvent used should be just sufficient to result in a total dissolution of the purified visnadine under the action of heat. Active carbon is added to the solution and this is filtered, a filtering aid being added if required. The colourless filtrate is then left to stand 24 to 48 hours at about −10° C., and then filtered in a Buchner funnel to recover the crystalline deposit of visnadine which has formed.

The crystallized visnadine obtained by either of the above methods is first dried in air, then in an oven in vacuo at a temperature not higher than 45–50° C. There is finally obtained, with a yield of 6 to 7 per mil, a white crystalline substance having the formula indicated above and having substantially identical characteristics with those of the compound visnadine as discovered by Smith and his co-workers.

What I claim is:

1. In a method of extracting visnadin having the formula

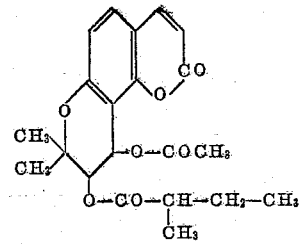

from the dried umbels of Ammi visnaga, the steps comprising: extracting pulverized de-seeded umbels of Ammi visnaga with petroleum ether, partially concentrating the petroleum ether extract by evaporation at a temperature not exceeding about 80° C., allowing the partially concentrated extract to stand until a gummy precipitate has separated out, removing the supernatant liquid, concentrating the removed liquid under reduced pressure, allowing the obtained concentrate to stand at a temperature of about −10° C. to allow a precipitate of crude visnadin to crystalize out, and removing said crude visnadin.

2. Method in accordance with claim 1 wherein the petroleum ether boils at about 35 to 70° C.

3. Method in accordance with claim 1 including the steps of purifying the crude visnadin comprising: mixing the crude visnadin with petroleum ether thereby to form a pulp, allowing the pulp to stand for about 24 hours at a temperature of about 15° C., and filtering said pulp to obtain pure visnadin.

4. Method in accordance with claim 3 including the steps of crystallizing the pure visnadin comprising: dissolving the pure visnadin in a solvent selected from the group consisting of tetrahydrofuran, dioxane, ethyl ether, isopropyl ether, methanol, ethanol, propanol, cyclohexanol, methyl acetate, ethyl acetate, benzene, toluene, acetone, methyl-ethyl-ketone, ethylene glycol, diethylene glycol, propylene glycol, glycol monoacetate, methylene chloride, chloroform, monochlorethylene, dicholorethylene, trichlorethylene, pyridine and dimethyl formamide, adding activated carbon thereto, filtering, adding to the filtrate a solvent selected from the group consisting of pentane, hexane, heptane and petroleum ether boiling in the range of about 35–70° C., and distilled water, allowing the solution to stand at about −10° C. until crystallized visnadin separates out, and removing the crystallized visnadin therefrom.

5. Method in accordance with claim 1, including the steps of purifying the crude visnadin comprising: dissolving the crude visnadin with warming in a solvent selected from the group consisting of cyclohexane and a petroleum fraction distilling in the range of about 70–100° C., adding activated charcoal to the solution, filtering, allowing the filtrate to stand at a temperature of about −10° C. until crystalline visnadin separates out, and removing the crystalline visnadin therefrom.

References Cited in the file of this patent

UNITED STATES PATENTS 2,608,560    Aschner et al.    Aug. 26, 1952
2,816,118    Smith et al.    Dec. 10, 1957

OTHER REFERENCES

Smith et al.: Jour. Amer. Chem. Soc., vol. 79, pages 3534–40 (July, 1957).